Aug. 20, 1968 J. R. HARNISH 3,397,552
REFRIGERATION SYSTEMS
Filed July 24, 1967
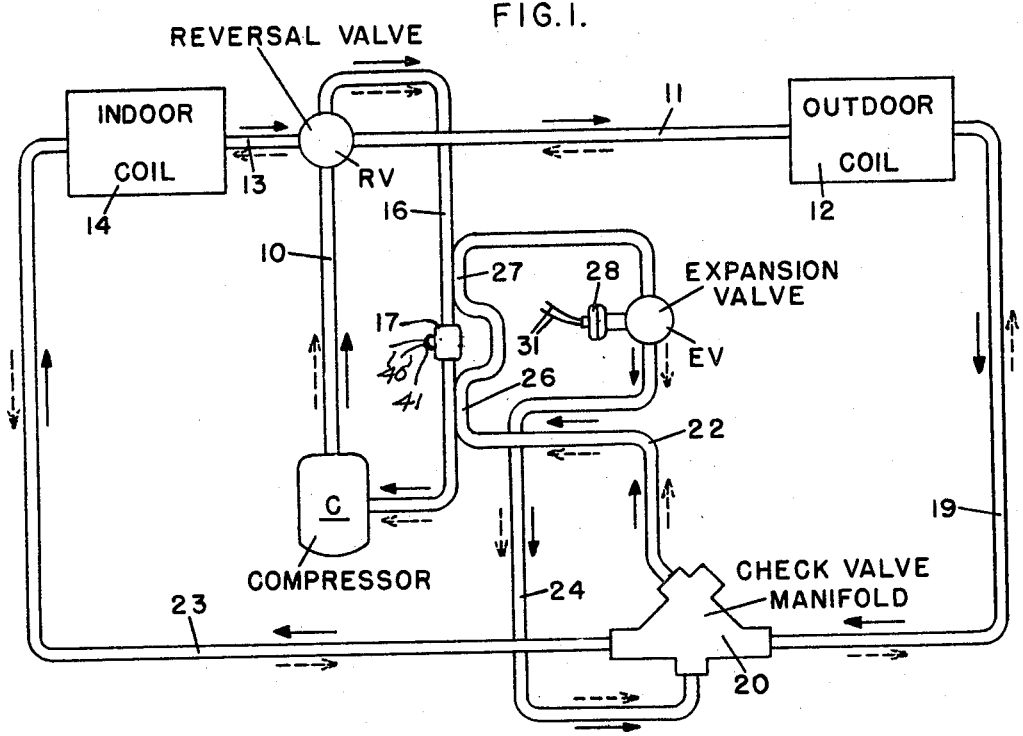
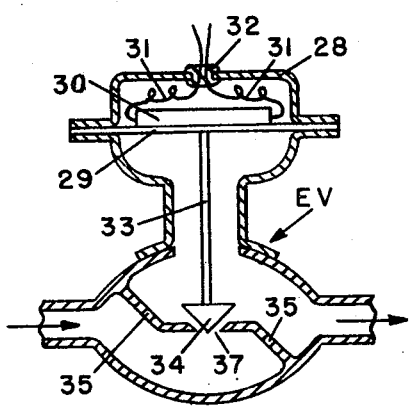
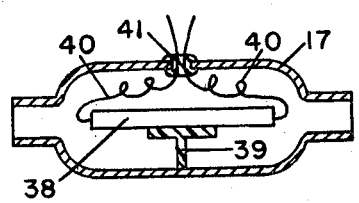
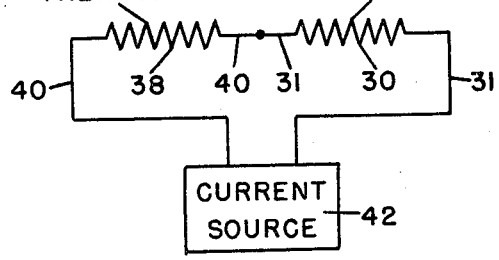
INVENTOR:
JAMES R. HARNISH,
BY Robert J. Falmer
ATTORNEY United States Patent Office 3,397,552
Patented Aug. 20, 1968

3,397,552
REFRIGERATION SYSTEMS
James R. Harnish, Staunton, Va., assignor to Westinghouse Electric Corporation, Pittsburgh, Pa., a corporation of Pennsylvania
Filed July 24, 1967, Ser. No. 655,471
8 Claims. (Cl. 62—202)

ABSTRACT OF THE DISCLOSURE

An expansion valve of a refrigeration system has a bimetallic diaphragm connected to its valve piston. A heater resistor is in heat exchange contact with the diaphragm, and is connected electrically in series with a thermistor in the suction gas line of the system to an electric current source. The liquid line of the system is in heat exchange contact with the suction gas line on both sides of the thermistor. The evaporator of the system is overfed so that some refrigerant liquid flows through the suction gas line in contact with the thermistor. When more than a selected quantity of liquid contacts the thermistor, its resistance increases, reducing the current flowing through the heater resistor, causing the diaphragm to warp in a direction to move the valve piston towards closed position, and vice versa. The heat exchange between the liquid line and the suction gas line downstream of the thermistor, evaporates all of the refrigerant liquid flowing past the thermistor, the liquid within the liquid line being subcooled by this heat exchange. The heat exchange between the liquid line and the suction gas line upstream of the thermistor evaporates some of the refrigerant liquid entering the suction gas line, the liquid within the liquid line being further subcooled by this heat exchange.

Field of the invention

The field of the invention is refrigeration systems in which evaporators are fed by modulating expansion valves. Thermostatic expansion valves are the most widely used expansion valves. They respond to superheat in the suction gas, and operate to prevent refrigerant liquid from entering the suction gas lines, some of the evaporator surface being used to superheat the suction gas. In multi-zone, direct expansion, air cooling systems as well as in other systems having varying air flow over evaporator coils, at reduced air flow, refrigerant distribution through the evaporator coils becomes poor so that the usual thermostatic expansion valve cannot operate properly. Another disadvantage of a thermostatic expansion valve is that when used with a condenser coil cooled by outdoor air, at low outdoor temperatures, the condensing pressure is insufficient to operate the expansion valve properly.

My U.S. Patent No. 3,264,837 discloses the use of a subcooling control valve as an expansion valve in a system in which there is a large amount of subcooling of the refrigerant liquid. Such a valve in such a system has none of the faults of a thermostatic expansion valve, and further aids in the subcooling. The associated evaporator, due to the large amount of subcooling, is overfed so that all of its internal surface is thoroughly wetted with increased heat transfer. The system of my patent requires, however, an accumulator to store the refrigerant liquid flowing from the evaporator, and an associated heat exchanger through which the high pressure liquid flows, for evaporating the excess refrigerant liquid so that it cannot flow into the associated compressor.

Summary of the invention

In a refrigeration system consisting of a compressor, a condenser, a liquid line, an expansion valve, an evaporator, and a suction gas line connected in series in the order named, the expansion valve has a bimetallic diaphragm with a heater resistor in heat exchange contact therewith. The suction gas line contains a NTC (negative temperature coefficient of resistance) thermistor, connected electrically in series with the heater resistor to an electric current source. The liquid line is in heat exchange contact with the suction gas line on both the downstream and upstream sides of the thermistor. The thermistor is cooled by the suction gas and liquid flowing in contact with its surface, the amount that it is cooled varying conformably with the amount of refrigerant liquid contacting its surface. The high pressure liquid is subcooled by the contact of the liquid line with the suction gas line so that the expansion valve overfeeds the evaporator, with, for example, 8% liquid and 92% gas flowing from the evaporator into the suction gas line. The heat exchange contact of the liquid line with the suction gas line upstream of the thermistor evaporates most of the liquid entering the suction gas tube so that, for example, 1% liquid and 99% gas flow in contact with the surface of the thermistor. When more than this amount of liquid flows in contact with the thermistor, the latter is so cooled that its resistance increases, reducing the current flowing through the heater resistor, and reducing the heat applied to the bimetallic diaphragm of the expansion valve so that it warps to move the valve piston of the expansion valve towards closed position. When less than 1% liquid contacts the thermistor, the latter is cooled less so that its resistance decreases, increasing the current through the heater resistor, and increasing the heat applied to the diaphragm of the expansion valve so that it warps to move the valve piston of the expansion valve towards open position. The refrigerant liquid flowing past the thermistor is evaporated by the heat exchange contact of the liquid line with the suction gas line downstream of the thermistor so that no refrigerant liquid enters the compressor.

Brief description of the drawings

FIG. 1 is a diagrammatic view of a heat pump embodying this invention;

FIG. 2 is an enlarged view, in section, of the expansion valve of FIG. 1;

FIG. 3 is an enlarged view, in section, of the coupling in the suction gas tube of FIG. 1, and of a thermistor within the coupling; and FIG. 4 is a circuit schematic showing the connection of the heater resistor of FIG. 2, and of the thermistor of FIG. 3 to an electric current source.

Description of the preferred embodiment of the invention

Referring first to FIG. 1 of the drawings, a refrigerant compressor C is connected by discharge gas tube 10 to a reversal valve RV which is connected by tube 11 to outdoor coil 12, and by tube 13 to indoor coil 14. The valve RV is connected by suction gas tube 16 containing a coupling 17, to the suction side of the compressor C. The outdoor coil 12 is connected by tube 19 to check-valve manifold 20 which is connected by tube 22 to the inlet of expansion valve EV, and which is connected by tube 24 to the outlet of the expansion valve EV. The manifold 20 is connected by tube 23 to the indoor coil 14. The details of the manifold 20 are disclosed in my and R. W. Ayling's joint U.S. Patent No. 3,299,661.

The tube 22 is a liquid tube, and has a portion 26 in heat exchange contact with the suction gas tube 16 downstream of the coupling 17. The tube 22 has another portion 27 in heat exchange contact with the suction gas tube 16 upstream of the coupling 17.

Referring now to FIG. 2 of the drawings, the expansion valve EV has a diaphragm chamber 28 across which extends a bimetallic diaphragm 29. A heater resistor 30 coated with a suitable insulation such as Teflon, is in heat exchanbe contact with the diaphragm 29. The ends of the resistor 30 are connected to wires 31 which extend through an insulator bushing 32 in the wall of the chamber 28. The diaphragm 29 is connected at its center to one end of piston rod 33 which has a valve piston 34 on its other end. The body of the valve EV has a partition 35 extending across its interior between its refrigerant inlet and outlet, and which has a valve opening 37, the edge of which forms a seat for the piston 34 when the latter closes the opening 37.

Referring now to FIG. 3 of the drawings, a NTC thermistor 38 is supported by insulator bracket 39 from the inner surface of the coupling 17. The ends of the thermistor 38 are connected to wires 40 which extend through an insulator bushing 41 in the wall of the coupling 17.

Referring now to FIG. 4 of the drawings, the thermistor 38 and the heater resistor 30 are connected in series to electric current source 42.

*Cooling operation of the heat pump*

The solid-line arrows alongside the tubing of FIG. 1 show the direction of refrigerant flow during cooling operation. The reversal valve RV is adjusted to its cooling position so that discharge gas from the compressor C flows the tube 10, the reversal valve RV and the tube 11 into the outdoor coil 12 operating as a condenser coil. Refrigerant liquid flows from the coil 12 through the tube 19 into the manifold 20, and from the latter through the liquid tube 22 into the expansion valve EV. Refrigerant flows from the valve EV through the tube 24 into the manifold 20, and from the latter through the tube 23 into the indoor coil 14 operating as an evaporator coil. Refrigerant flows from the coil 14 through the tube 13, the reversal valve RV and the suction gas tube 16 to the suction side of the compressor C.

There is a large amount of subcooling of the liquid flowing through the liquid tube 22 caused by the heat exchange between its portions 26 and 27 with the suction gas tube 16, and this subcooling so increases the refrigerating effect that the indoor coil 14 is overfed, and so that for example, 8% refrigerant liquid and 92% gas flow from the coil 14 into the suction gas tube 16. The heat exchange between the liquid tube portion 27 and the suction gas tube 16 upstream of the thermistor 38 evaporates most of this 8% liquid so that, for example, 1% liquid and 99% gas flow in contact with the thermistor 38. If more than 1% liquid flows in contact with the thermistor 38, its increased cooling causes its resistance to increase, causing decreased current through the heater resistor 30, decreasing the temperature of the diaphragm 29 which warps in a direction to move the valve piston 34 towards closed position to decrease the amount of refrigerant supplied into the coil 14. If less than 1% liquid flows in contact with the thermistor 38, its decreased cooling causes its resistance to decrease, causing increased current through the heater resistor 30, increasing the temperature of the diaphragm 29 which warps in the opposite direction to move the valve piston 34 towards open position to increase the amount of refrigerant supplied into the coil 14.

The heat exchange between the liquid tube portion 26 and the suction gas tube 16 downstream of the thermistor 38 evaporates the refrigerant liquid that has flowed past the thermistor 38 so that no refrigerant liquid enters the compressor C.

Without the subcooling provided by the heat exchange between the liquid tube portion 27 with the suction gas tube 16 upstream of the thermistor 38, the indoor coil 14 would be overfed less so that, for example, 1% liquid instead of 8% liquid would flow from the coil 14 into the suction gas tube 16.

The cooling operation described in the foregoing is also that of a non-reversible refrigeration system in which the reversal valve RV and the manifold 20 would not be used.

*Heating operation of the heat pump*

The dashed-line arrows alongside the tubing of FIG. 1 show the direction of refrigerant flow during heating operation. The reversal valve RV is adjusted to its heating position so that discharge gas from the compressor C flows through the tube 10, the reversal valve RV and the tube 13 into the indoor coil 14 operating as a condenser coil. Refrigerant liquid flows from the coil 14 through the tube 23 into the manifold 20, and from the latter through the tube 22 into the expansion valve EV. Refrigerant flows from the latter through the tube 24 into the manifold 20, and from the latter through the tube 19 into the outdoor coil 12 operating as an evaporator coil. Refrigerant flows from the coil 12 through the tube 11, the reversal valve RV, and the suction gas tube 16 to the suction side of the compressor C.

The expansion valve EV, the thermistor 38, and the heat exchange between the liquid and suction gas tubes, operate during heating operation as described in the foregoing in connection with cooling operation.

Among the advantages of this invention over systems using thermostatic expansion valves, are that since the coil operating as an evaporator coil is overfed, all of its internal surface is throughly wetted with refrigerant liquid with increased heat transfer and efficiency; refrigerant distribution is not a problem due to the overfeeding by the expansion valve, and operation at lower outdoor temperatures is possible because of the large amount of subcooling of the refrigerant liquid.

I claim:

1. A refrigeration system comprising a compressor, a condenser, a liquid tube, an expansion valve, an evaporator, and a suction gas tube connected in series in the order named, means for adjusting said valve to overfeed said evaporator so that refrigerant liquid and gas flow from said evaporator into said suction gas tube, said means including means within and responsive to the flow of refrigerant liquid within said suction gas tube, and including means for adjusting said valve towards closed position on an increase in the quantity of liquid contacting said responsive means above a predetermined quantity, and for adjusting said valve towards open position on a decrease in the quantity of liquid contacting said responsive means below said predetermined quantity, and means providing heat exchange between the high pressure liquid flowing through said liquid tube and the liquid and gas flowing through said suction gas tube upstream of said responsive means, and downstream of said responsive means.

2. A refrigeration system as claimed in claim 1 in which said valve contains heat responsive means for adjusting said valve towards open and closed positions, and contains a heater resistor for heating said heat responsive means, in which said responsive means within said suction gas tube comprises a thermistor, in which there is provided a source of electric current, and in which said resistor and said thermistor are connected in series to said source.

3. A heat pump comprising a refrigerant compressor, reversal means, a discharge gas tube connecting said reversal means to said compressor, an outdoor coil, a second tube connecting said reversal means to said coil, an indoor coil, a third tube connecting said reversal means to said indoor coil, a suction gas tube connecting said reversal means to said compressor, an expansion valve, means including a liquid tube for connecting the one of said coils that is operating as a condenser to the inlet of said expansion valve, means including a sixth tube for connecting the outlet of said expansion valve to the one of said coils that is operating as an evaporator coil, said reversal means in cooling position routing discharge gas through said second tube into said outdoor coil operating as a condenser coil, and routing refrigerant from said indoor coil operating as an evaporator coil through said third tube to the suction side of said compressor, said reversal means in heating position routing discharge gas through said third tube into said indoor coil operating as a condenser coil, and routing refrigerant from said outdoor coil operating as an evaporator coil through said second tube to said suction side of said compressor, means for adjusting said expansion valve to overfeed the one of said coils that is operating as an evaporator coil, said adjusting means comprising means within and responsive to the flow of refrigerant liquid within said suction gas tube and comprising means for adjusting said valve towards closed position on an increase in the quantity of liquid contacting said responsive means above a predetermined quantity, and for adjusting said valve towards open position on a decrease in the quantity of liquid contacting said responsive means below said predetermined quantity, and means providing heat exchange contact between the liquid flowing through said liquid tube and the liquid and gas flowing through said suction gas tube upstream of said responsive means.

4. A heat pump as claimed in claim 3 in which there is provided means for providing heat exchange between the high pressure liquid flowing through said liquid tube and the liquid and gas flowing through said suction gas tube downstream of said responsive means.

5. A heat pump as claimed in claim 3 in which said valve contains heat responsive means for adjusting said valve towards open and closed positions, and contains a heater resistor for heating said heat responsive means, in which said responsive means within said suction gas tube comprises a thermistor, in which there is provided a source of electric current, and in which said resistor and said thermistor are so connected to said source that an increase in the resistance of said thermistor causes a decrease in the current flowing through said resistor.

6. A heat pump as claimed in claim 5 in which there is provided means for providing heat exchange between the high pressure liquid flowing through said liquid tube and the liquid and gas flowing through said suction gas tube downstream of said thermistor.

7. A refrigeration system comprising a compressor, a condenser, a liquid tube, an expansion valve, an evaporator, and a suction gas tube connected in series in the order named, means for adjusting said valve to overfeed said evaporator so that refrigerant liquid and gas flow from said evaporator into said suction gas tube, said means including means within and responsive to the flow of refrigerant liquid within said suction gas tube, and including means for adjusting said valve towards closed position on an increase in the quantity of liquid contacting said responsive means above a predetermined quantity, and for adjusting said valve towards open position on a decrease in the quantity of liquid contacting said responsive means below said predetermined quantity, and means providing heat exchange contact between the high pressure liquid flowing through said liquid tube and the liquid and gas flowing through said suction gas tube upstream of said responsive means.

8. A refrigeration system as claimed in claim 7 in which said valve contains heat responsive means for adjusting said valve towards open and closed positions, and contains a heater resistor for heating said heat responsive means, in which said responsive means within said suction gas tube comprises a thermistor, in which there is provided a source of electric current, and in which said resistor and said thermistor are so connected to said source that an increase in the resistance of said thermistor causes a decrease in the current flowing through said resistor.

References Cited

UNITED STATES PATENTS 2,534,455  12/1950  Koontz _____ 62—202
3,205,675   9/1965  Matthies _____ 62—225

WILLIAM J. WYE, *Primary Examiner.*